Patented July 17, 1934

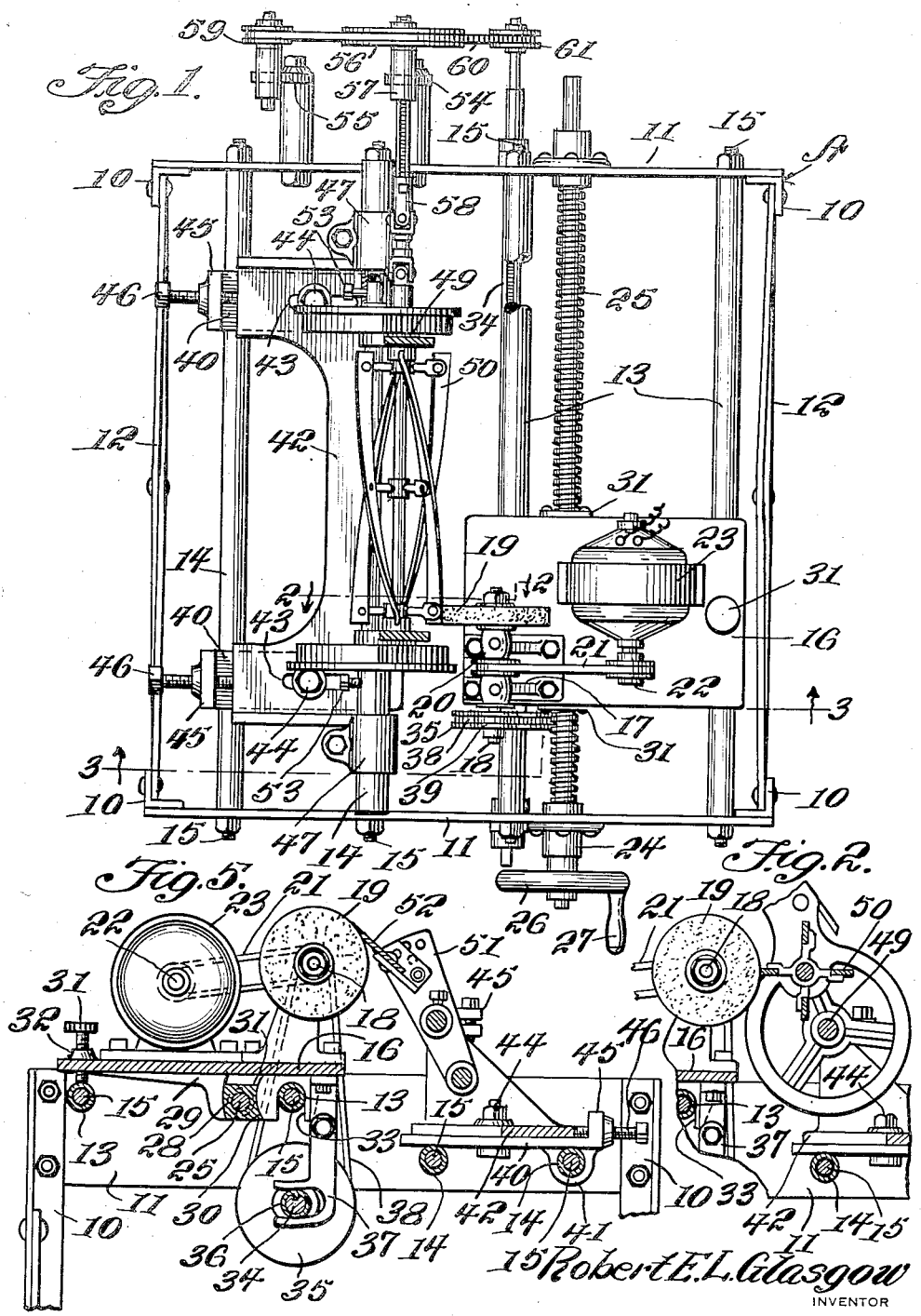

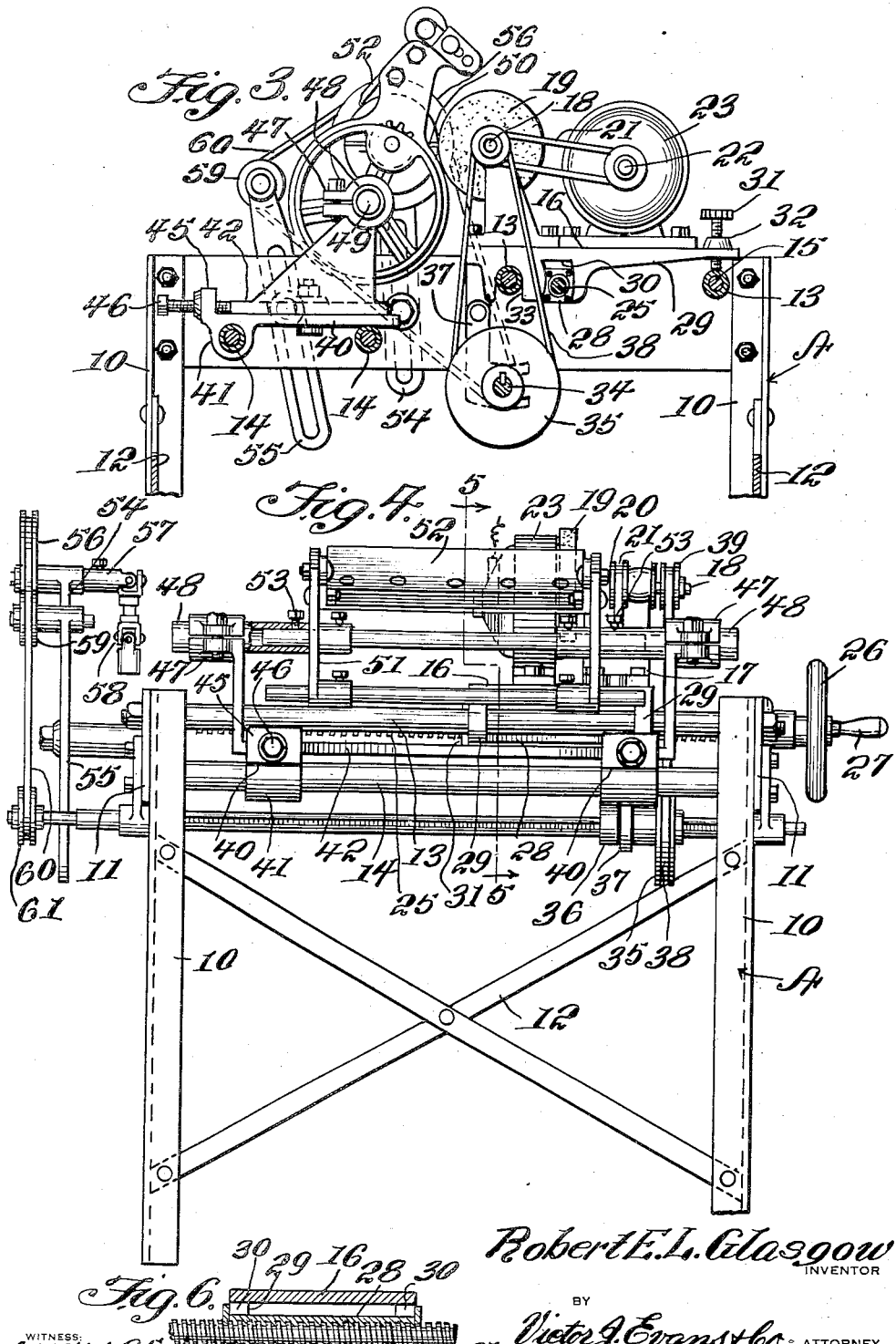

1,967,118

UNITED STATES PATENT OFFICE 1,967,118

SHARPENING MACHINE

Robert E. L. Glasgow, Richmond, Va.

Application January 15, 1934, Serial No. 706,732

3 Claims. (Cl. 51—48)

The invention relates to a sharpening machine and more especially to a lawn mower sharpening device.

The primary object of the invention is the provision of a machine or device of this character, wherein the stand of the same has adjustably fitted therewith a work holder for accommodating either the stationary blade of a lawn mower or the cutting wheel and adjuncts of such lawn mower, so that the blade or blades may be conveniently sharpened under the automatic operation of the machine or device, the grinding wheel being motor driven and fed through the medium of a manually operated feed screw to the work.

Another object of the invention is the provision of a machine or device of this character, wherein the grinding wheel, which is motor driven, is susceptible of adjustment so as to become properly set with relation to a blade or blades to be sharpened and the work holder is adjustably supported for the proper locating or positioning of the work with relation to the grinding wheel.

A further object of the invention is the provision of a machine or device of this character which is comparatively simple in its construction, thoroughly reliable and efficient in its purpose, susceptible of adjustment both for the grinding wheel and the work, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereinto appended.

In the accompanying drawings:

Figure 1 is a top plan view, partly broken away, of a machine or device constructed in accordance with the invention and showing the cutting wheel of a lawn mower held in the work holder for the sharpening of the blades of said wheel.

Figure 2 is a fragmentary sectional view on the line 2—2 of Figure 1, looking in the direction of the arrows.

Figure 3 is a fragmentary sectional view on the line 3—3 of Figure 1, looking in the direction of the arrows.

Figure 4 is an end elevation of the machine or device showing the work holder for the stationary blade of the lawn mower.

Figure 5 is a fragmentary sectional view on the line 5—5 of Figure 4, looking in the direction of the arrows.

Figure 6 is a fragmentary vertical sectional view showing the feed screw and its coupling with the grinder carriage of the machine or device.

Similar reference characters indicate corresponding parts throughout the several views in the drawings.

Referring to the drawings in detail, A designates generally a stand constituting a supporting frame of the machine or device and including corner uprights 10, side pieces 11 and end crossed braces 12, these being united in any suitable manner to assure rigidity to the frame.

Mounted in the side pieces of the frame constituting the stand A, at opposite sides of the transverse center of the latter, are the pairs of spaced transversely disposed guide tubes 13 and 14, respectively, these having trained therethrough tie rods 15 which make fast such tubes to the side pieces 11 of the stand A.

Slidably supported upon the guide tubes 13 is a grinder including a base 16 having at the proper location thereon the bearings 17 for the power shaft 18 of a grinder wheel 19, the shaft being equipped with a driving pulley 20 having trained thereover the belt 21 operated from the motor shaft 22 of an electric power motor 23, the same being carried by the base 16 of the carriage.

Located between the guide tubes 13 and supported in bearings 24 fitted with the side pieces 11 is a feed screw 25, the same being arranged parallel with said guide tubes 13 and at one end is fitted a hand wheel 26 provided with a handle 27 for its manual turning. Fitted upon the screw 25 and in threaded engagement therewith is a feed sleeve 28, the latter being loosely fitted in retainer brackets 29 fixed to and depending from the under face of the base 16 of the carriage, each retainer bracket being formed with a curved slot 30 receiving said sleeve 28, and at the other side of each bracket 29 is an abutment plate 31 which confines the sleeve 28 interfitted with said brackets 29 and thus it should be obvious that when the screw 25 is turned, this advances or retreats the sleeve 28 and likewise the base 16 of the carriage. In other words, a direct drive is had between the screw 25 and the carriage for the travel of the latter upon the guide tubes 13 in the operation of the machine or device. At the same time, the base 16 can be angularly set without the release of the sleeve 28 from the brackets 29 on said base and such adjustment is obtained by a set screw 31' threaded in a boss 32 on the base 16, the screw 31' having its bearing upon the guide tube 13 next thereto. In this manner the grinding wheel 19 can be related with the work to be sharpened. Each bracket 29 has a notch 33 for accommodating one of the guide tubes 13 in the mounting of the carriage upon such tubes.

Beneath the plane of the guide tubes 13 and suitably journaled on the side pieces 11 of the stand A is a rotary driven shaft 34 upon which is splined or keyed a driven pulley 35 for longitudinal movement thereon, the pulley being formed with a hub 36 with which engages a shifting fork 37 fixed to the underside of the base 16 of the carriage, so that on the travel of the carriage the pulley 35 will move therewith upon the shaft 34 and this pulley has trained thereover a driven belt 38, the same being also trained over a pulley 39 on the power shaft 18 of the grinding wheel 19. Thus this power shaft 18 will transmit motion to the shaft 34 for the driving thereof for a purpose presently described.

Upon the guide tubes 14 is supported a work holder comprising a pair of slides 40 having the collars 41 embracing one of the pair of guide tubes 14, while said slides 40 rest upon the other guide tube 14 of the pair. Superimposed upon these slides 40 is a base plate 42 having the slots 43 receiving locking screws 44 threaded into said slides 40 so that the plate 42 is susceptible of displacement upon the slides 40 to the extent of the slots 43 and may be fastened securely in displaced position. The slides 40 are formed with upturned ears 45 having threaded therein adjusting screws 46, these working against the plate 42 so that it can be adjusted under displacement upon the slides 40, as should be clearly apparent.

Formed with the plate 42 are the upstanding spaced chuck clamps 47 for adjustably accommodating horizontally aligned oppositely disposed chucks 48 for the detachable fitting of the work therewith, the adjustability of the chucks 48 being to permit varying sized work to be held thereby, as for example, the traction wheels' axle of a lawn mower, or the adjustable holders 51 for the stationary blade 52 of the lawn mower, the holders 51 and the blade 52 being clearly disclosed in Figure 4 of the drawings, the blade wheel 50 and its power axle 49 of the lawn mower being shown in Figures 1, 2 and 3 of said drawings, the chuck 48 being fitted with the locking screws 53 or other locking mediums suitable thereto.

Mounted on one side plate 11 of the stand A are the adjustable hangers 54 and 55, respectively, the hanger 54 being fitted with a belt pulley 56, its axle 57 being connected with a universal coupling 58, the latter being adapted for detachable connection with the power axle 49 for the wheel 50 of the lawn mower and the other bracket 55 carrying a belt tightener pulley 59 which, with the pulley 56, has trained thereover the belt 60, the same being trained over the pulley 61 fixed to the shaft 34 so that motion therefrom will be transmitted to the shaft 49 as connected with the universal coupling 58, this coupling being had only when sharpening the blades of the wheel 50 of the lawn mower, as is indicated in Figure 1 of the drawings. The coupling 58 is freed when the stationary blade 52 is in the work holder for the sharpening of said blade.

It should be obvious that the piece of work to be operated upon can be properly positioned for the grinding wheel 19 to operate thereon for the sharpening operation.

The adjustment of the set screw 31 will regulate the tilting position of the grinding wheel 19 as the base 16 of the carriage can be angularly adjusted under the set screw 31, as will be apparent from Figure 5 of the drawings.

What is claimed is:

1. A machine of the kind described comprising a supporting frame having pairs of spaced transversely disposed guide tubes at its top and on opposite sides of the transverse median of said frame, a base above a pair of said tubes, retainer brackets at the underside of the base and having matched curved slots, a feed screw arranged in said frame, a feed sleeve carried by said screw and received in said slots, abutment plates carried by the brackets to confine the sleeve in the slots, a power unit on said base, a rotary grinding tool supported on said base, a rotary driven shaft journaled in said frame, a pulley slidably keyed to said rotary driven shaft and having a hub, a rocking fork fixed to the underside of the base and engaged with said hub to move the pulley with the base, driven connections between the power unit and said rotary grinding tool and said pulley, and means carried by the base for adjusting the same in a vertical arcuate direction.

2. A machine of the kind described comprising a supporting frame having pairs of spaced transversely disposed guide tubes at its top and on opposite sides of the transverse median of said frame, a base above a pair of said tubes, retainer brackets at the underside of the base and having matched curved slots, a feed screw arranged in said frame, a feed sleeve carried by said screw and received in said slots, abutment plates carried by the brackets to confine the sleeve in the slots, a power unit on said base, a rotary grinding tool supported on said base, a rotary driven shaft journaled in said frame, a pulley slidably keyed to said rotary driven shaft and having a hub, a rocking fork fixed to the underside of the base and engaged with said hub to move the pulley with the base, driven connections between the power unit and said rotary grinding tool and said pulley, means carried by the base for adjusting the same in a vertical arcuate direction, a work support on the other pair of tubes, and connections between a piece of work in the support and the rotary driven shaft.

3. A machine of the kind described comprising a supporting frame having pairs of spaced transversely disposed guide tubes at its top and on opposite sides of the transverse median of said frame, a base above a pair of said tubes, retainer brackets at the underside of the base and having matched curved slots, a feed screw arranged in said frame, a feed sleeve carried by said screw and received in said slots, abutment plates carried by the brackets to confine the sleeve in the slots, a power unit on said base, a rotary grinding tool supported on said base, a rotary driven shaft journaled in said frame, a pulley slidably keyed to said rotary driven shaft and having a hub, a rocking fork fixed to the underside of the base and engaged with said hub to move the pulley with the base, driven connections between the power unit and said rotary grinding tool and said pulley, means carried by the base for adjusting the same in a vertical arcuate direction, a work support on the other pair of tubes, connections between a piece of work in the support and the rotary driven shaft, and means for adjusting the work support.

ROBERT E. L. GLASGOW.